US007903751B2

(12) United States Patent
Fiesel et al.

(10) Patent No.: US 7,903,751 B2
(45) Date of Patent: Mar. 8, 2011

(54) DEVICE AND METHOD FOR GENERATING A DATA STREAM AND FOR GENERATING A MULTI-CHANNEL REPRESENTATION

(75) Inventors: Wolfgang Fiesel, Schwanstetten (DE); Matthias Neusinger, Rohr (DE); Harald Popp, Tuchenbach (DE); Stephan Geyersberger, Würzburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 819 days.

(21) Appl. No.: 11/863,523

(22) Filed: Sep. 28, 2007

(65) Prior Publication Data

US 2008/0013614 A1 Jan. 17, 2008

Related U.S. Application Data

(63) Continuation of application No. PCT/EP2006/002369, filed on Mar. 15, 2006.

(30) Foreign Application Priority Data

Mar. 30, 2005 (DE) ........................ 10 2005 014 477

(51) Int. Cl.
*H04K 1/10* (2006.01)
*H04L 27/28* (2006.01)

(52) U.S. Cl. ......... 375/260; 375/224; 375/354; 375/359; 704/200

(58) Field of Classification Search .................. 375/224, 375/260, 354, 359; 704/200
See application file for complete search history.

(56) References Cited

U.S. PATENT DOCUMENTS

| | | | | |
|---|---|---|---|---|
| 6,611,212 | B1 | 8/2003 | Craven et al. | |
| 7,567,899 | B2 * | 7/2009 | Bogdanov | 704/231 |
| 2002/0080977 | A1 | 6/2002 | Cheng | |
| 2003/0026441 | A1 | 2/2003 | Faller | |
| 2003/0035553 | A1 | 2/2003 | Baumgarte et al. | |
| 2003/0219130 | A1 | 11/2003 | Baumgarte et al. | |
| 2004/0148159 | A1 | 7/2004 | Crockett et al. | |
| 2006/0122839 | A1 * | 6/2006 | Li-Chun Wang et al. | 704/273 |

(Continued)

FOREIGN PATENT DOCUMENTS

TW 510144 B 11/2002

(Continued)

OTHER PUBLICATIONS

Translation of the official communication issued in counterpart International Application No. PCT/EP2006/002369, mailed on Oct. 11, 2007.

(Continued)

*Primary Examiner* — Curtis B Odom
(74) *Attorney, Agent, or Firm* — Keating & Bennett, LLP

(57) ABSTRACT

For time synchronization of a data stream with multi-channel additional data and a data stream with data on at least one base channel, a fingerprint information calculation is performed on the encoder side for the at least one base channel to insert the fingerprint information into a data stream in time connection to the multi-channel additional data. On the decoder side, fingerprint information are calculated from the at least one base channel and used together with the fingerprint information extracted from the data stream to calculate and compensate a time offset between the data stream with the multi-channel additional information and the data stream with the at least one base channel, for example by means of a correlation, to obtain a synchronized multi-channel representation.

25 Claims, 10 Drawing Sheets

U.S. PATENT DOCUMENTS

2006/0190450 A1* 8/2006 Holm et al. ........................ 707/6

FOREIGN PATENT DOCUMENTS

| | | | |
|---|---|---|---|
| TW | 200537436 | A | 11/2005 |
| WO | 03/091990 | A1 | 11/2003 |
| WO | 2005/011281 | A1 | 2/2005 |
| WO | 2006/034825 | A1 | 4/2006 |

PUBLICATIONS

Official communication issued in the International Application No. PCT/EP2006/002369, mailed on Jul. 7, 2006.

Herre et al., "Spatial Audio Coding: Next-generation Efficient and Compatible Coding of Multi-Channel Audio"; Audio Engineering Society Convention Paper 6186, 117th Convention; San Francisco, CA; pp. 1-13; Oct. 28-31, 2004.

Herre et al., "Intensity Stereo Coding"; Preprints of Papers Presented at the AES Convention, Amsterdam, pp. 1-10; Feb. 26-Mar. 1, 1994.

Faller et al., "Binaural Cue Coding Applied to Stereo and Multi-Channel Audio Compression"; Audio Engineering Society Convention Paper 5574, 112th Convention; Munich, Germany; pp. 1-9; May 10-13, 2002.

Faller et al., "Binaural Cue Coding: Part II: Schemes and Applications", 2003 IEEE Transactions on Speech and Audio Processing; vol. 11, No. 6; pp. 520-531; Nov. 2003.

English translation of the official communication issued in counterpart Taiwanese Application No. 95110552, mailed on Mar. 10, 2009.

* cited by examiner

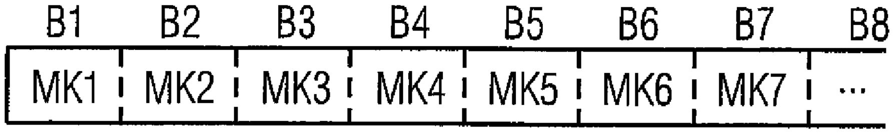

original multi-channel signal (e.g. 5.1)

FIGURE 7A

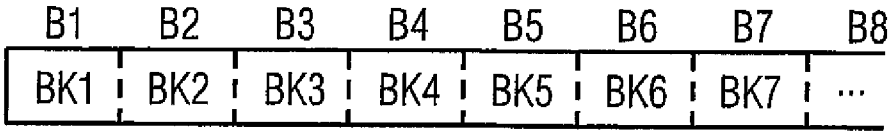

one or more base channels
(e.g. 2 stereo base channels)

FIGURE 7B

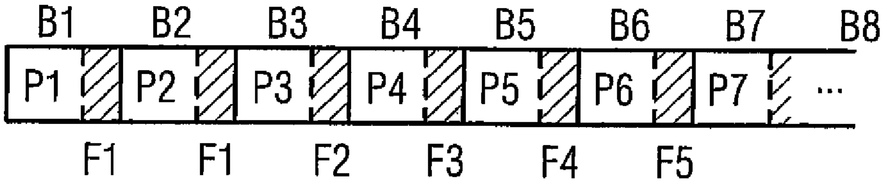

data stream with multi-channel information and
fingerprint information (F1, F2, ..., F6, ...)

e.g. P3: multi-channel info to reconstruct the block of values MK3 of the original multi-channel signal together with block of values BK3 of the base channels e.g. F3: block fingerprint (e.g. energy measure) of the block of values BK3 or
block fp of BK3 - block fp of BK2 (difference)

FIGURE 7C block B3 of the data stream block fp = energy measure for BK3 or (absolute)
energy measure for BK3 -
energy measure for BK2 (difference)

encoder and decoder 1. calculate mono sum energy $$E_{mono\ sum} = \sum_{i=0}^{1152} S_{left}(i)^2 + S_{right}(i)^2$$

2. minimum limitation $$E_{(db)} = 10 * \log(E_{mono\ sum} + E_{offset})$$

3. difference calculation in the encoder and decoder or only in the decoder $$E_{db(diff)} = E_{db}(current\_block) - E_{db}(previous\_block)$$

4. scaling of the block fingerprint $$E_{scaled} = E_{db(diff)} * A_{gain}(t)$$

5. quantization $$E_{quantized} = Q_{8bit}[saturation_0^{255}(E_{scaled})]$$

only encoder 6. entropy-coding (Huffman or arithmetic, ...)

coded block fingerprint in the field block fp in Fig. 7d

FIGURE 11

DEVICE AND METHOD FOR GENERATING A DATA STREAM AND FOR GENERATING A MULTI-CHANNEL REPRESENTATION

CROSS-REFERENCE TO RELATED APPLICATIONS

This application is a continuation of copending International Application No. PCT/EP2006/002369, filed Mar. 15, 2006, which designated the United States and was not published in English.

BACKGROUND OF THE INVENTION

1. Field of the Invention

The present invention relates to audio signal processing and particularly to multi-channel processing techniques based on generating a multi-channel reconstruction of an original multi-channel signal on the basis of at least one base channel and/or downmix channel and multi-channel additional information.

2. Description of the Related Art

Technologies currently in development allow ever more efficient transmission of audio signals by data reduction, but also an increase of the listening pleasure by extensions, such as by the use of multi-channel technology. Examples for such an extension of the common transmission techniques have recently become known under the name of binaural cue coding (BCC) and "Spatial Audio Coding", as described in J. Herre, C. Faller, S. Disch, C. Ertel, J. Hilbert, A. Hoelzer, K. Linzmeier, C. Sprenger, P. Kroon: "Spatial Audio Coding: Next Generation Efficient and Compatible Coding of Multi-Channel Audio", 117th AES Convention, San Francisco 2004, Preprint 6186.

The following will discuss various techniques for reducing the data amount needed for the transmission of a multi-channel audio signal in more detail.

Such techniques are called joint stereo techniques. For this purpose, see FIG. 3 showing a joint stereo device 60. This device may be a device implementing, for example, the intensity stereo (IS) technique or the binaural cue coding technique (BCC). Such a device usually receives at least two channels CH1, CH2, . . . CHn as input signal and outputs a single carrier channel and parametric multi-channel information. The parametric data are defined so that an approximation of an original channel (CH1, CH2, . . . CHn) may be calculated in a decoder.

Normally, the carrier channel will include subband samples, spectral coefficients, time domain samples, etc., which provide a relatively fine representation of the underlying signal, while the parametric data do not include any such samples or spectral coefficients, but control parameters for controlling a determined reconstruction algorithm, such as weighting by multiplying, by time shifting, by frequency shifting, etc. The parametric multi-channel information thus includes a relatively rough representation of the signal or the associated channel. Expressed in numbers, the amount of data needed by a carrier channel is an amount of about 60 to 70 kbit/s, while the amount of data needed by parametric side information for a channel is in the range from 1.5 to 2.5 kbit/s. It is to be noted that the above numbers apply to compressed data. Of course, an uncompressed CD channel necessitates data rates in the order of about 10 times as much. An example of parametric data are the known scale factors, intensity stereo information or BCC parameters, as will be described below.

The technique of intensity stereo coding is described in the AES preprint 3799 "Intensity Stereo Coding", J. Herre, K. H. Brandenburg, D. Lederer, February 1994, Amsterdam. In general, the concept of intensity stereo is based on a main axis transform which is to be performed on data of both stereophonic audio channels. If most data points are concentrated around the first main axis, a coding gain may be achieved by rotating both signals by a determined angle prior to the coding. However, this does not apply to real stereophonic reproduction techniques. Thus this technique is modified in that the second orthogonal component is excluded from the transmission in the bit stream. Thus the reconstructed signals for the left and the right channel consist of differently weighted or scaled versions of the same transmitted signal. Nevertheless, the reconstructed signals differ in amplitude, but they are identical with respect to their phase information. The energy-time envelopes of both original audio channels, however, are maintained by means of the selective scaling operation typically operating in a frequency-selective fashion. This corresponds to the human perception of sound at high frequencies, where the dominant spatial information is determined by the energy envelopes.

In addition, in practical implementations the transmitted signal, i.e. the carrier channel, is generated from the sum signal of the left channel and the right channel instead of the rotation of both components. Furthermore, this processing, i.e. the generation of intensity stereo parameters for performing the scaling operations, is performed in a frequency-selective way, i.e. independently for each scale factor band, i.e. for each encoder frequency partition. Advantageously, both channels are combined to form a combined or "carrier" channel and the intensity stereo information in addition to the combined channel. The intensity stereo information depends on the energy of the first channel, the energy of the second channel or the energy of the combined channel.

The BCC technique is described in the AES convention paper 5574 "Binaural Cue Coding applied to stereo and multi-channel audio compression", T. Faller, F. Baumgarte, May 2002, Munich. In BCC coding, a number of audio input channels is converted to a spectral representation, namely using a DFT-based transform with overlapping windows. The resulting spectrum is divided into non-overlapping portions, each of which has an index. Each partition has a bandwidth proportional to the equivalent rectangular bandwidth (ERB). The inter-channel level differences (ICLD) and the inter-channel time differences (ICTD) are determined for each partition and for each frame k. The ICLD and ICTD are quantized and coded to finally get into a BCC bit stream as side information. The inter-channel level differences and the inter-channel time differences are given for each channel relative to a reference channel. Then the parameters are calculated according to predetermined formulae depending on the particular partitions of the signal to be processed.

On the decoder side, the decoder normally receives a mono signal and the BCC bit stream. The mono signal is transformed to the frequency domain and input into a spatial synthesis block also receiving decoded ICLD and ICTD values. In the spatial synthesis block, the BCC parameters (ICLD and ICTD) are used to perform a weighting operation of the mono signal to synthesize the multi-channel signals which, after a frequency/time conversion, represent a reconstruction of the original multi-channel audio signal.

In the case of BCC, the joint stereo module 60 operates to output the channel side information so that the parametric channel data are quantized and coded ICLD or ICTD parameters, wherein one of the original channels is used as reference channel for coding the channel side information.

Normally, the carrier signal is formed of the sum of the participating original channels.

Of course, the above techniques only provide a mono representation for a decoder which is only able to process the carrier channel, but which is not capable of processing the parametric data for generating one or more approximations of more than one input channel.

The BCC technique is also described in the US patent publications US 2003/0219130 A1, US 2003/0026441 A1 and US 2003/0035553 A1. In addition, see the specialist publication "Binaural Cue Coding. Part II: Schemes and Applications", T. Faller and F. Baumgarte, IEEE Trans. On Audio and Speech Proc., vol. 11, no. 6, November 2003.

In the following, a typical BCC scheme for multi-channel audio coding will be presented in more detail with reference to FIGS. 4 to 6.

FIG. 5 shows such a BCC scheme for coding/transmission of multi-channel audio signals. The multi-channel audio input signal at an input 110 of a BCC encoder 112 is mixed down in a so called downmix block 114. In this example, the original multi-channel signal at the input 110 is a 5 channel surround signal having a front left channel, a front right channel, a left surround channel, a right surround channel, and a center channel. In the embodiment of the present invention, the downmix block 114 generates a sum signal by simple addition of these five channels into a mono signal.

Other downmixing schemes are known in the art, so that a downmix channel with a single channel is obtained using a multi-channel input signal.

This single channel is output on a sum signal line 115. Side information obtained by the BCC analysis block 116 is output on a side information line 117.

In the BCC analysis block, inter-channel level differences (ICLD) and inter-channel time differences (ICTD) are calculated as described above. Recently, the BCC analysis block 116 has also become capable of calculating inter-channel correlation values (ICC values). The sum signal and the side information are transmitted to a BCC decoder 120 in a quantized and coded format. The BCC decoder splits the transmitted sum signal into a number of subbands and performs scalings, delays and other processing steps to provide the subbands of the multi-channel audio channels to be output. This processing is performed so that the ICLD, ICTD and ICC parameters (cues) of a reconstructed multi-channel signal at output 121 match the corresponding cues for the original multi-channel signal at input 110 in the BCC encoder 112. For this purpose, the BCC decoder 120 includes a BCC synthesis block 122 and a side information processing block 123.

The following will illustrate the internal structure of the BCC synthesis block 122 with respect to FIG. 6. The sum signal on the line 115 is fed to a time/frequency conversion unit or filter bank FB 125. At the output of block 125, there is a number N of subband signals or, in an extreme case, a block of spectral coefficients, if the audio filter bank 125 performs a 1:1 transform, i.e. a transform generating N spectral coefficients from N time domain samples.

The BCC synthesis block 122 further includes a delay stage 126, a level modification stage 127, a correlation processing stage 128, and an inverse filter bank stage IFB 129. At the output of stage 129, the reconstructed multi-channel audio signal having, for example, five channels in the case of a 5 channel surround system may be output to a set of loudspeakers 124, as illustrated in FIG. 5 or FIG. 4.

The input signal sn is converted to the frequency domain or the filter bank domain by means of element 125. The signal output by element 125 is copied such that several versions of the same signal are obtained, as illustrated by the copy node 130. The number of versions of the original signal is equal to the number of output channels in the output signal. Then each version of the original signal is subjected to a determined delay $d_1, d_2, \ldots, d_i, \ldots d_N$ at the node 130. The delay parameters are calculated by the side information processing block 123 in FIG. 5 and derived from the inter-channel time differences as they were calculated by the BCC analysis block 116 of FIG. 5.

The same applies to the multiplication parameters $a_1, a_2, \ldots a_i, \ldots, a_N$, which are also calculated by the side information processing block 123 based on the inter-channel level differences as calculated by the BCC analysis block 116.

The ICC parameters calculated by the BCC analysis block 116 are used for controlling the functionality of block 128 so that determined correlations between the delayed and level-manipulated signals are obtained at the outputs of block 128. It is to be noted that the order of the stages 126, 127, 128 may be different from the order shown in FIG. 6.

It is to be noted that, in a framewise processing of the audio signal, the BCC analysis is also performed framewise, i.e. variable in time, and that there is further obtained a frequency-wise BCC analysis, as apparent by the filter bank division of FIG. 6. This means that the BCC parameters are obtained for each spectral band. This means further that, in the case in which the audio filter bank 126 splits the input signal into, for example, 32 bandpass signals, the BCC analysis block obtains a set of BCC parameters for each of the 32 bands. Of course, the BCC synthesis block 122 of FIG. 5, illustrated in detail in FIG. 6, performs a reconstruction also based on the 32 bands given by way of example.

With reference to FIG. 4, the following will present a scenario used to determine individual BCC parameters. Normally, the ICLD, ICTD and ICC parameters may be defined between channel pairs. However, it is advantageous to determine the ICLD and ICTD parameters between a reference channel and each other channel. This is illustrated in FIG. 4A.

ICC parameters may be defined in various ways. Generally speaking, ICC parameters may be determined in the encoder between any channel pairs, as illustrated in FIG. 4B. However, there has been the suggestion to calculate only ICC parameters between the strongest two channels at one time, as illustrated in FIG. 4C, which shows an example in which, at one time, an ICC parameter between the channels 1 and 2 is calculated, and at another time, an ICC parameter between the channels 1 and 5 is calculated. The decoder then synthesizes the inter-channel correlation between the strongest channels in the decoder and uses certain heuristic rules for calculating and synthesizing the inter-channel coherence for the remaining channel pairs.

With respect to the calculation of, for example, the multiplication parameters $a_1$, $a_N$ based on the transmitted ICLD parameters, reference is made to the AES convention paper no. 5574. The ICLD parameters represent an energy distribution of an original multi-channel signal. Without loss of generality, it is advantageous, as shown in FIG. 4A, to take four ICLD parameters representing the energy difference between the respective channels and the front left channel. In the side information processing block 122, the multiplication parameters $a_1, \ldots, a_N$ are derived from the ICLD parameters so that the total energy of all reconstructed output channels is the same (or proportional to the energy of the transmitted sum signal).

Generally, a generation of at least one base channel and the side information takes place in such particularly parametric multi-channel coding schemes, as apparent from FIG. 5. Typically, block-based schemes are used in which, as also apparent from FIG. 5, the original multi-channel signal at input 110 is subjected to a block processing by a block stage 111 such that the downmix signal and/or sum signal and/or the at least one base channel for this block is formed from a block of, for example, 1152 samples, while, at the same time, the corresponding multi-channel parameters are generated for this block by the BCC analysis. After the downmix channel, the sum signal is typically coded again with a block-based encoder, such as an MP3 encoder or an AAC encoder, to obtain a further data rate reduction. Likewise, the parameter data are coded, for example by difference coding, scaling/quantizing and entropy coding. Generally, the fingerprint generator is formed to perform a quantization and entropy coding of fingerprint values to obtain the fingerprint information.

Then, at the output of the entire encoder, including the BCC encoder 112 and a downstream base channel encoder, a common data stream is written in which a block of the at least one base channel follows a previous block of the at least one base channel, and in which the coded multi-channel additional information are also inserted, for example by a bit stream multiplexer.

This insertion is done so that the data stream of base channel data and multi-channel additional information includes a block of base channel data and includes a block of multi-channel additional data in association with this block, which then form, for example, a common transmission frame. This transmission frame is then sent to a decoder via a transmission path.

On the input side, the decoder again includes a data stream demultiplexer to split a frame of the data stream into a block of base channel data and a block of associated multi-channel additional information. Then the block of base data is decoded, for example by an MP3 decoder or an AAC decoder. This block of decoded base data is then supplied to the BCC decoder 102 together with the block of multi-channel additional information, which may also be decoded.

In that way, the time association of the additional information with the base channel data is set automatically due to the common transmission of base channel data and additional information and may readily be recovered by a decoder operating in a framewise fashion. The decoder thus automatically finds, as it were, the additional information associated with a block of base channel data due to the common transmission of the two data types in a single data stream so that a high quality multi-channel reconstruction is possible. Thus, there will no problem that the multi-channel additional information have a time offset with respect to the base channel data. If, however, there was such an offset, this would result in a significant quality loss of the multi-channel reconstruction, because in that case a block of base channel data is processed together with multi-channel additional data, although these multi-channel additional data do not belong to the block of base data, but, for example, to a previous or later block.

Such a scenario in which the association between multi-channel additional data and base channel data is no longer given will occur when no common data stream is written, but when there is a distinct data stream with the base channel data and there is another data stream separate therefrom with the multi-channel additional information. Such a situation may occur, for example, in a transmission system operating sequentially, such as radio or internet. Here, the audio program to be transmitted is divided into audio base data (mono or stereo downmix audio signal) and extension data (multi-channel additional information) which are emitted individually or in a combined fashion. Even if the two data streams are sent out by a transmitter still synchronous in time, a lot of “surprises” may be lurking on the transmission path to the receiver which result in the data stream with the multi-channel additional data, which is substantially more compact with respect to the number of bits, being transmitted, for example, faster to a receiver than the data stream with the base channel data.

Furthermore, it is advantageous to use encoders/decoders with non-constant output data rate to achieve a particularly good bit efficiency. Here, it cannot be predicted how long the decoding of a block of base channel data will take. Furthermore, this processing also depends on the actually used hardware components for decoding, as they have to be present, for example, in a PC or digital receiver. Furthermore, there are also system and/or algorithmic inherent blurrings, because, particularly in the bit reservoir technique, a constant output data rate is generated on the average, but, locally speaking, bits not needed for a particularly well codable block are saved to be withdrawn from the bit reservoir for another block that is particularly difficult to code, because the audio signal is, for example, particularly transient.

On the other hand, the separation of the above described common data stream into two individual data streams has special advantages. For example, a classic receiver, i.e. for example a pure mono or stereo receiver, is capable of receiving and reproducing the audio base data at any time independent of content and version of the multi-channel additional information. The division into separate data streams thus ensures the backward compatibility of the whole concept.

In contrast, a receiver of the newer generation may evaluate these multi-channel additional data and combine them with the audio base data so that the complete extension, here the multi-channel sound, is provided to the user.

A particularly interesting application scenario of the separate transmission of audio base data and extension data exists in digital radio. Here, the multi-channel additional information helps to extend the stereo audio signal emitted up to now to a multi-channel format, such as 5.1, by little additional transmission effort. Here, the program provider generates the multi-channel additional information on the transmitter side from multi-channel sound sources, as they are to be found, for example, on DVD audio/video. Subsequently, this multi-channel additional information is transmitted in parallel to the audio stereo signal emitted as usual, which, however, now is not simply a stereo signal, but includes two base channels that have been derived from the multi-channel signal by some downmix. For the listener, however, the stereo signal of the two base channels sounds like a usual stereo signal, because, in the multi-channel analysis, there are finally taken steps similar to those having been taken by a sound master that mixed a stereo signal from several tracks.

A great advantage of the separation consists in the compatibility with the already existing digital radio transmission systems. A classic receiver that is not able to evaluate this additional information will be able to receive and reproduce the two-channel sound signal as usual without any qualitative restrictions. A receiver of newer design, however, may evaluate this multi-channel information in addition to the stereo sound signal previously received, decode it and reconstruct the original 5.1 multi-channel signal therefrom.

In order to allow the simultaneous transmission of the multi-channel additional information as a supplement to the stereo signal previously used, it is possible, as already mentioned, to combine the multi-channel additional information with the coded downmix audio signal for a digital radio system, i.e. that there is a single data stream which is then scalable, if necessary, and may also be read by an existing receiver which, however, ignores the additional data with respect to the multi-channel additional information.

The receiver thus also only sees a (valid) audio data stream and, if it is a receiver of newer design, may further extract the multi-channel sound additional information from the data stream via a corresponding upstream data distributor again synchronously to the associated audio data block, decode it and output it as 5.1 multi-channel sound.

The disadvantage of this approach, however, is the extension of the existing infrastructure and/or the existing data paths so that they may transport the data signals combined of downmix signals and extension instead of only the stereo audio signals as previously. So, if we leave the standard transmission format for stereo data, the synchronism may be guaranteed by the common data stream also in radio transmissions.

However, it is a big problem for a breakthrough on the market if existing radio infrastructures have to be changed, i.e. if the problem does not only exist on the side of the decoder, but also on the side of the radio transmitters and the normalized transmission protocols. This concept is thus very disadvantageous due to the problem to change a system once it has been standardized and implemented.

The other alternative is not to couple the multi-channel additional information to the used audio coding system and thus not to insert it into the actual audio data stream. In this case, the transmission is done via a distinct parallel digital additional channel, which, however, does not necessarily have to be synchronized in time. This situation may occur when the downmix data are passed by a usual audio distribution infrastructure existing in studios in unreduced form, for example as PCM data by AES/EBU data format. These infrastructures are designed to digitally distribute audio signals between diverse sources. For this purpose, there are usually used functional units known as "cross rails". Alternatively or additionally, audio signals are also processed in the PCM format for reasons of sound regulation and dynamic compression. All these steps result in incalculable delays on a path from the transmitter to the receiver.

On the other hand, the separate transmission of base channel data and multi-channel additional information is particularly interesting because existing stereo infrastructures do not have to be changed, i.e. the disadvantages of non-conformity with the standards described with respect to the first possibility do not apply here. A radio system only has to transmit an additional channel, but does not have to change the infrastructure for the already existing stereo channel. The additional effort is thus carried only, as it were, on the side of the receivers, but in a way that there is backward compatibility, i.e. that a user having a new receiver gets better sound quality than a user having an old receiver.

As already discussed, the order of magnitude of the time shift cannot be determined any more from the received audio signal and the additional information. Thus a reconstruction and association of the multi-channel signal that are correct in time are no longer guaranteed in the receiver. A further example of such a delay problem is when an already running two-channel transmission system is to be extended to multi-channel transmission, for example in a receiver of a digital radio. Here, it is often the case that the decoding of the downmix signal is done by means of a two-channel audio decoder already present in the receiver, whose delay time is not known and thus cannot be compensated. In an extreme case, the downmix audio signal may even reach the multi-channel reconstruction audio decoder via a transmission chain containing analog parts, i.e. that a digital/analog conversion is done at one point and that, after further storage/ transmission, there is again an analog/digital conversion. Something like that occurs in radio transmission. Also, initially no clues are available as to how a suitable delay compensation of the downmix signal may be performed relative to the multi-channel additional data. Also, if the sample frequency for the A/D conversion and the sample frequency for the D/A conversion differ slightly from each other, there will be a slow time drift of the necessary compensation delay corresponding to the ratio of the two sample rates to each other.

For the synchronization of the additional data to the base data, various techniques may be used that are known by the term "time synchronization methods". They are based on inserting time stamps into both data streams such that, based on these time stamps, a correct association of the data associated with each other may be achieved in the receiver. The insertion of time stamps, however, already results in a change of the normal stereo infrastructure.

SUMMARY OF THE INVENTION

According to an embodiment, a device for generating a data stream for a multi-channel reconstruction of an original multi-channel signal, wherein the multi-channel signal has at least two channels, may have: a fingerprint generator for generating fingerprint information from at least one base channel derived from the original multi-channel signal, wherein a number of base channels is equal to or larger than 1 and less than a number of channels of the original multi-channel signal, wherein the fingerprint information gives a progress in time of the at least one base channel; and a data stream generator for generating a data stream from the fingerprint information and of time-variable multi-channel additional information which, together with the at least one base channel, allow the multi-channel reconstruction of the original multi-channel signal, wherein the data stream generator is formed to generate the data stream so that a time connection between the multi-channel additional information and the fingerprint information may be derived from the data stream.

According to another embodiment, a device for generating a multi-channel representation of an original multi-channel signal from at least one base channel and a data stream having fingerprint information giving a progress in time of the at least one base channel and multi-channel additional information which, together with the at least one base channel, allow the multi-channel reconstruction of the original multi-channel signal, wherein a connection between the multi-channel additional information and the fingerprint information may be derived from the data stream, may have: a fingerprint generator for generating test fingerprint information from the at least one base channel; a fingerprint extractor for extracting the fingerprint information from the data stream to obtain reference fingerprint information; and a synchronizer for synchronizing the multi-channel additional information and the at least one base channel in time using the test fingerprint information, the reference fingerprint information and a connection of the multi-channel information and the fingerprint information included in the data stream, which is derived from the data stream, to obtain a synchronized multi-channel representation.

According to another embodiment, a method for generating a data stream for a multi-channel reconstruction of an original multi-channel signal, wherein the multi-channel signal has at least two channels, may have the steps of: generating fingerprint information from at least one base channel derived from the original multi-channel signal, wherein a number of base channels is equal to or larger than 1 and less than a number of channels of the original multi-channel signal, wherein the fingerprint information gives a progress in time of the at least one base channel; and generating a data stream from the fingerprint information and of time-variable multi-channel additional information which, together with the at least one base channel, allow the multi-channel reconstruction of the original multi-channel signal, wherein the data stream is generated so that a time connection between the multi-channel additional information and the fingerprint information may be derived from the data stream.

According to another embodiment, a method for generating a multi-channel representation of an original multi-channel signal from at least one base channel and a data stream having fingerprint information giving a progress in time of the at least one base channel and multi-channel additional information which, together with the at least one base channel, allow the multi-channel reconstruction of the original multi-channel signal, wherein a connection between the multi-channel additional information and the fingerprint information may be derived from the data stream, may have the steps of: generating test fingerprint information from the at least one base channel; extracting the fingerprint information from the data stream to obtain reference fingerprint information; and synchronizing the multi-channel additional information and the at least one base channel using the test fingerprint information, the reference fingerprint information and a connection of the multi-channel information and the fingerprint information included in the data stream, which is derived from the data stream, to obtain a synchronized multi-channel representation.

According to another embodiment, a computer program may have a program code for performing, when the computer program runs on a computer, a method for generating a data stream for a multi-channel reconstruction of an original multi-channel signal, wherein the multi-channel signal has at least two channels, wherein the method may have the steps of: generating fingerprint information from at least one base channel derived from the original multi-channel signal, wherein a number of base channels is equal to or larger than 1 and less than a number of channels of the original multi-channel signal, wherein the fingerprint information gives a progress in time of the at least one base channel; and generating a data stream from the fingerprint information and of time-variable multi-channel additional information which, together with the at least one base channel, allow the multi-channel reconstruction of the original multi-channel signal, wherein the data stream is generated so that a time connection between the multi-channel additional information and the fingerprint information may be derived from the data stream.

According to another embodiment, a computer program may have a program code for performing, when the computer program runs on a computer, a method for generating a multi-channel representation of an original multi-channel signal from at least one base channel and a data stream having fingerprint information giving a progress in time of the at least one base channel and multi-channel additional information which, together with the at least one base channel, allow the multi-channel reconstruction of the original multi-channel signal, wherein a connection between the multi-channel additional information and the fingerprint information may be derived from the data stream, wherein the method may have the steps of: generating test fingerprint information from the at least one base channel; extracting the fingerprint information from the data stream to obtain reference fingerprint information; and synchronizing the multi-channel additional information and the at least one base channel using the test fingerprint information, the reference fingerprint information and a connection of the multi-channel information and the fingerprint information included in the data stream, which is derived from the data stream, to obtain a synchronized multi-channel representation.

According to another embodiment, a data stream may have fingerprint information giving a progress in time of at least one base channel derived from an original multi-channel signal, wherein a number of base channels is equal to or larger than 1 and less than a number of channels of the original multi-channel signal, and multi-channel additional information which, together with the at least one base channel, allow the multi-channel reconstruction of the original multi-channel signal, wherein a connection between the multi-channel additional information and the fingerprint information may be derived from the data stream.

The data stream may comprise control signals to generate a synchronized multi-channel representation of the original multi-channel signal, when the data stream is fed into a device for generating a multi-channel representation of an original multi-channel signal from at least one base channel and a data stream comprising fingerprint information giving a progress in time of the at least one base channel and multi-channel additional information which, together with the at least one base channel, allow the multi-channel reconstruction of the original multi-channel signal, wherein a connection between the multi-channel additional information and the fingerprint information may be derived from the data stream, the device comprising: a fingerprint generator for generating test fingerprint information from the at least one base channel; a fingerprint extractor for extracting the fingerprint information from the data stream to obtain reference fingerprint information; and a synchronizer for synchronizing the multi-channel additional information and the at least one base channel in time using the test fingerprint information, the reference fingerprint information and a connection of the multi-channel information and the fingerprint information included in the data stream, which is derived from the data stream, to obtain a synchronized multi-channel representation.

The present invention is based on the finding that a separate transmission and time synchronous merging of a base channel data stream and a multi-channel additional information data stream is made possible by modifying the multi-channel data stream on the "transmitter side" so that fingerprint information giving a progress in time of the at least one base channel are inserted into the data stream with the multi-channel additional information such that a connection between the multi-channel additional information and the fingerprint information may be derived from the data stream. Thus, determined multi-channel additional information belongs to determined base channel data. It is exactly this association that has to be secured also in the transmission of separate data streams.

According to the invention, the association of multi-channel additional information with base channel data is signaled on the transmitter side by determining fingerprint information from the base channel data with which the multi-channel additional information belonging to exactly these base channel data are marked, as it were. This marking and/or signaling of the connection between the multi-channel additional information and the fingerprint information is achieved in block-wise data processing by associating, with a block of multi-channel additional information exactly belonging to a block of base channel data, a block fingerprint of exactly this block of base channel data to which the considered block of multi-channel additional information belongs.

In other words, a fingerprint of exactly the base channel data block with which the multi-channel additional information have to be processed together in the reconstruction is associated with the multi-channel additional information. In a block-based transmission, the block fingerprint of the block of base channel data may be inserted in the block structure of the multi-channel additional data stream such that each block of multi-channel additional information contains the block fingerprint of the associated base data. The block fingerprint may be written directly after a previously used block of multi-channel additional information, or it may be written before the previously existing block, or it may be written at any known place within this block so that, in the multi-channel reconstruction, the block fingerprint may be read out for synchronization purposes. Thus, there are normal multi-channel additional data in the data stream as well as, correspondingly inserted, the block fingerprints.

Alternatively, the data stream could also be written so that, for example, all block fingerprints provided with additional information, such as a block counter, are located at the beginning of the data stream generated according to the invention, so that a first portion of the data stream contains only block fingerprints and a second part of the data stream contains the multi-channel additional data written blockwise that are associated with the block fingerprint information. This alternative has the disadvantage that reference information is needed, wherein, however, the association of the block fingerprints with the multi-channel additional information written blockwise may also be given implicitly by the order so that no additional information is needed.

In this case, there might initially simply be read in a large number of block fingerprints in the multi-channel reconstruction for synchronization purposes to obtain the reference fingerprint information. Gradually, the test fingerprints will be added until there will be a minimum number of test fingerprints used for a correlation. During this time duration, the set of reference fingerprints may already be subjected to, for example, difference coding, if the correlation in the multi-channel reconstruction is performed using differences, while no difference block fingerprints, but absolute block fingerprints are included in the data stream.

Generally speaking, the data stream with the base channel data is processed on the receiver side, i.e. it is first decoded, for example, and then supplied to a multi-channel reconstructor. Advantageously, this multi-channel reconstructor is designed so that it simply performs through-switching when it does not get any additional information to output the two base channels as stereo signal. In parallel, the extraction of the reference fingerprint information and the calculation of the test fingerprint information from the decoded base channel data is done to then perform a correlation calculation to calculate the offset of the base channel data to the multi-channel additional data. Depending on the implementation, there may then be a verification by a further correlation calculation that this offset is really the correct offset. This will be the case when the offset obtained by the second correlation calculation does not differ more than a predetermined threshold from the offset obtained by the first correlation calculation.

When this was the case, it may be assumed that the offset was correct. Subsequently, after the reception of synchronized multi-channel additional information, there is a switching from a stereo output to the multi-channel output.

This procedure is advantageous when a user is not supposed to notice the time needed for synchronization. Base channel data are thus processed the instant they are obtained so that, of course, only stereo data can be output in the period in which the synchronization takes place, i.e. the offset calculation takes place, because there has not been found any synchronized multi-channel additional information yet.

In another embodiment in which the "initial delay" needed for the calculation of the offset is not an issue, the reproduction may be performed so that the entire synchronization calculation is executed without already outputting stereo data in parallel to then provide synchronized multi-channel additional information starting from the first block of the base channel data. Then, the listener will have a synchronized 5.1 experience starting from the very first block.

In embodiments of the present invention, the time for a synchronization is normally about 5 seconds, because about 200 reference fingerprints are needed as reference fingerprint information for an optimal offset calculation. If this delay of about 5 seconds is not an issue, as it is the case in unidirectional transmissions, for example, a 5.1 reproduction may be given from the start—although only after the time needed for the offset calculation. For interactive applications, for example in the case of dialogs or the like, this delay will be unwanted, so that in this case the stereo reproduction will be switched to the multi-channel reproduction at some time when the synchronization is finished. For example, it has been found that it is better to provide only a stereo reproduction than a multi-channel reproduction with unsynchronized multi-channel additional information.

According to the invention, the time association problem between base channel data and multi-channel additional data is solved both by measures on the transmitter side and by measures on the receiver side.

On the transmitter side, time variable and suitable fingerprint information are calculated from the corresponding mono or stereo downmix audio signal. Advantageously, this fingerprint information is inserted regularly as synchronization assistance in the sent multi-channel additional data stream. This may be done as a data field in the middle of, for example, the spatial audio coding side information organized blockwise or so that the fingerprint signal is sent as the first or the last information of the data block such that it may easily be added or removed.

On the reception side, time variable and suitable fingerprint information are calculated from the corresponding stereo audio signal, i.e. the base channel data, wherein a number of two base channels is advantageous according to the invention. Furthermore, the fingerprints are extracted from the multi-channel additional information. Then the time offset between the multi-channel additional information and the received audio signal is calculated via correlation methods, such as a calculation of a cross-correlation between the test fingerprint information and the reference fingerprint information. Alternatively, there may also be performed trial and error methods in which various pieces of fingerprint information calculated from the base channel data based on various block rasters are compared to the reference fingerprint information to determine the time offset based on the test block raster whose associated test fingerprint information matches the reference fingerprint information best.

Finally, the audio signal of the base channels with the multi-channel additional information is synchronized for the subsequent multi-channel reconstruction by a downstream delay compensation stage. Depending on the implementation, only an initial delay may be compensated. Advantageously, however, the offset calculation is performed in parallel to the reproduction to be able to readjust the offset as necessary and based on the result of the correlation calculation in the case of the base channel data and the multi-channel additional information drifting apart in time despite a compensated initial delay. The delay compensation stage may thus also be regulated actively.

The present invention is advantageous in that no changes whatsoever have to be made in the base channel data and/or in the processing path for the base channel data. The base channel data stream fed into a receiver does not differ in any way from a conventional base channel data stream. Changes are only made on the side of the multi-channel data stream. It is modified in that the fingerprint information is inserted. But since there are currently no standardized methods for the multi-channel data stream anyway, the change of the multi-channel additional data stream does not result in an unwanted violation of an already standardized implemented and established solution, as it would be the case, however, if the base channel data stream was modified.

The inventive scenario provides a special flexibility of the distribution of multi-channel additional information. Particularly when the multi-channel additional information is parameter information, which is very compact with respect to the necessary data rate and/or storage capacity, a digital receiver may also be supplied with such data completely separately from the stereo signal. For example, users could get multi-channel additional information for stereo recordings already present in their stocks which they already have on their solid state players or on their CDs from a separate provider and store them on their reproduction devices. This storing does not present any problems, because the storage requirements particularly for parametric multi-channel additional information is not very large. If the user then inserts a CD or selects a stereo piece, the corresponding multi-channel additional data stream may be fetched from the multi-channel additional data memory and be synchronized with the stereo signal due to the fingerprint information in the multi-channel additional data stream to achieve a multi-channel reconstruction. The inventive solution thus allows to synchronize multi-channel additional data, which may come from a completely different source, with the stereo signal completely irrespective of the type of stereo signal, i.e. irrespective of whether it comes from a digital radio receiver, whether it comes from a CD, whether it comes from a DVD or whether it has arrived, for example, via the internet, wherein the stereo signal then acts as base channel data on the basis of which the multi-channel reconstruction is then performed.

BRIEF DESCRIPTION OF THE DRAWINGS

Embodiments of the present invention will be detailed subsequently referring to the appended drawings, in which:

FIG. 7*a* is a schematic representation of an original multi-channel signal as a sequence of blocks.

FIG. 7*b* is a schematic representation of one or more base channels as a sequence of blocks.

FIG. 7*c* is a schematic representation of the inventive data stream with multi-channel information and associated block fingerprints.

FIG. 11 is a schematic representation of the calculation of the fingerprint information and/or coded fingerprint information on the encoder and decoder side.

DETAILED DESCRIPTION OF PREFERRED EMBODIMENTS

Figure 1:
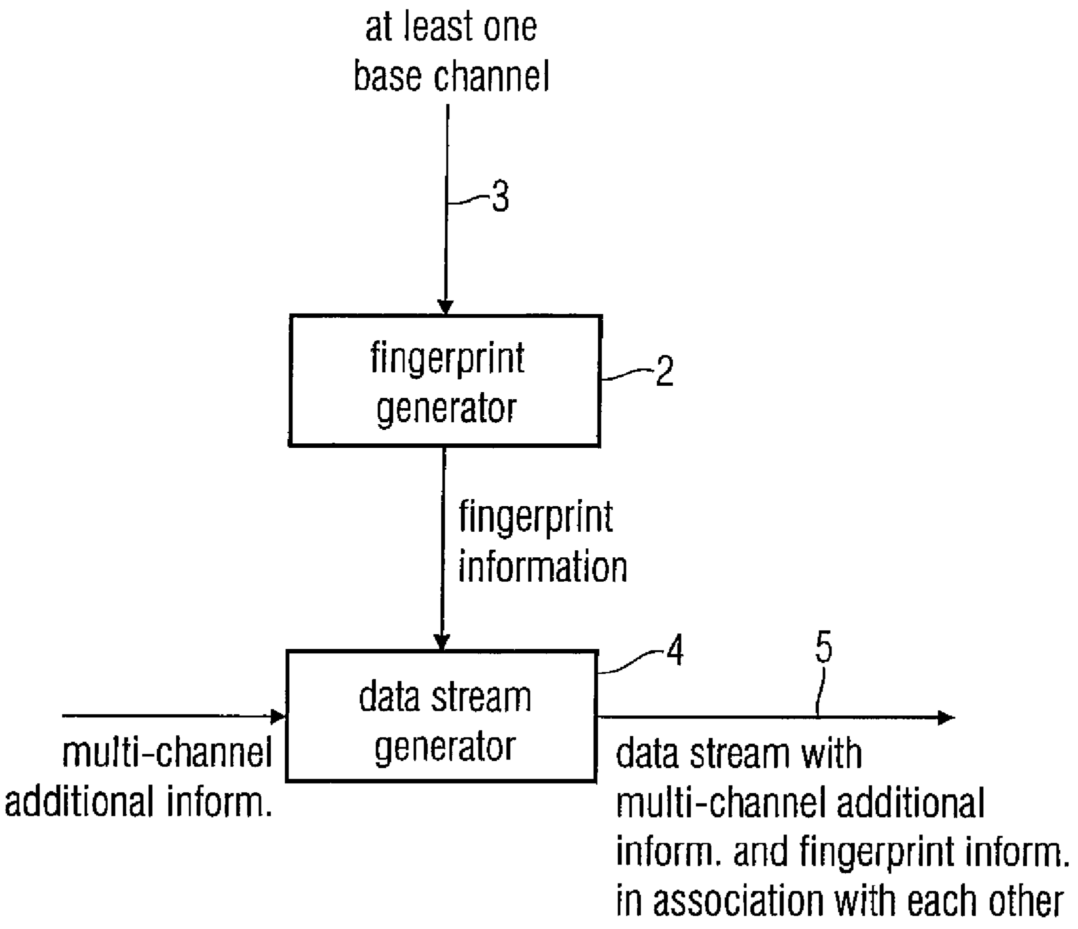
FIG. 1 is a block circuit diagram of an inventive device for generating a data stream.

FIG. 1 shows a device for generating a data stream for a multi-channel reconstruction of an original multi-channel signal, wherein the multi-channel signal has at least two channels, according to an embodiment of the present invention. The device includes a fingerprint generator 2 to which at least one base channel derived from the original multi-channel signal may be supplied via an input line 3. The number of base channels is equal to or larger than 1 and less then a number of channels of the original multi-channel signal. If the original multi-channel signal is only a stereo signal with only two channels, there is only a single base channel derived from the two stereo channels. If, however, the original multi-channel signal is a signal with three or more channels, the number of base channels may also be equal to 2. This implementation is advantageous, because an audio reproduction may then be performed without multi-channel additional data as normal stereo reproduction. In an embodiment of the present invention, the original multi-channel signal is a surround signal with five channels and an LFE channel (LFE=low frequency enhancement), wherein this channel is also referred to as subwoofer. The five channels are a left surround channel Ls, a left channel L, a center channel C, a right channel R, and a back right and/or right surround channel Rs. The two base channels are then the left base channel and the right base channel. Specialists refer to the one and/or the more base channels also as downmix channel and/or downmix channels.

The fingerprint generator 2 is designed to generate fingerprint information from the at least one base channel, wherein the fingerprint information gives a progress in time of the at least one base channel. Depending on the implementation, the fingerprint information is calculated involving more or less effort. For example, fingerprints calculated with a lot of effort particularly on the basis of statistical methods and known by the term “audio ID” may be used. Alternatively, however, there may also be used any other quantity representing the progress in time of the one or more base channels in any way.

According to the invention, block-based processing is advantageous. Here, the fingerprint information consists of a sequence of block fingerprints, wherein a block fingerprint is a measure for the energy of the one and/or more base channels in the block. Alternatively, however, a determined sample of the block or a combination of samples of the block could also be used, for example, as block fingerprint, because, with a sufficiently high number of block fingerprints as fingerprint information, there will be a reproduction—although a rough one—of the time characteristic of the at least one base channel. Generally speaking, the fingerprint information is thus derived from the sample data of the at least one base channel and gives the progress in time of the at least one base channel with a more or less large error, so that, as will be discussed later on, a correlation with test fingerprint information calculated from the base channel may be performed on the decoder/receiver side to finally determine the offset between the data stream with the multi-channel additional information and the base channel.

On the output side, the fingerprint generator 2 provides the fingerprint information which is supplied to a data stream generator 4. The data stream generator 4 is designed to generate a data stream from the fingerprint information and the typically time variable multi-channel additional information, wherein the multi-channel additional information together with the at least one base channel allow the multi-channel reconstruction of the original multi-channel signal. The data stream generator is designed to generate the data stream at an output 5 so that a connection between the multi-channel additional information and the fingerprint information may be derived from the data stream. According to the invention, the data stream of multi-channel additional information is thus marked with the fingerprint information that have been derived from the at least one base channel such that the association of certain multi-channel additional information with the base channel data may be determined via the fingerprint information whose association with the multi-channel additional information is provided by the data stream generator 4.

Figure 2:
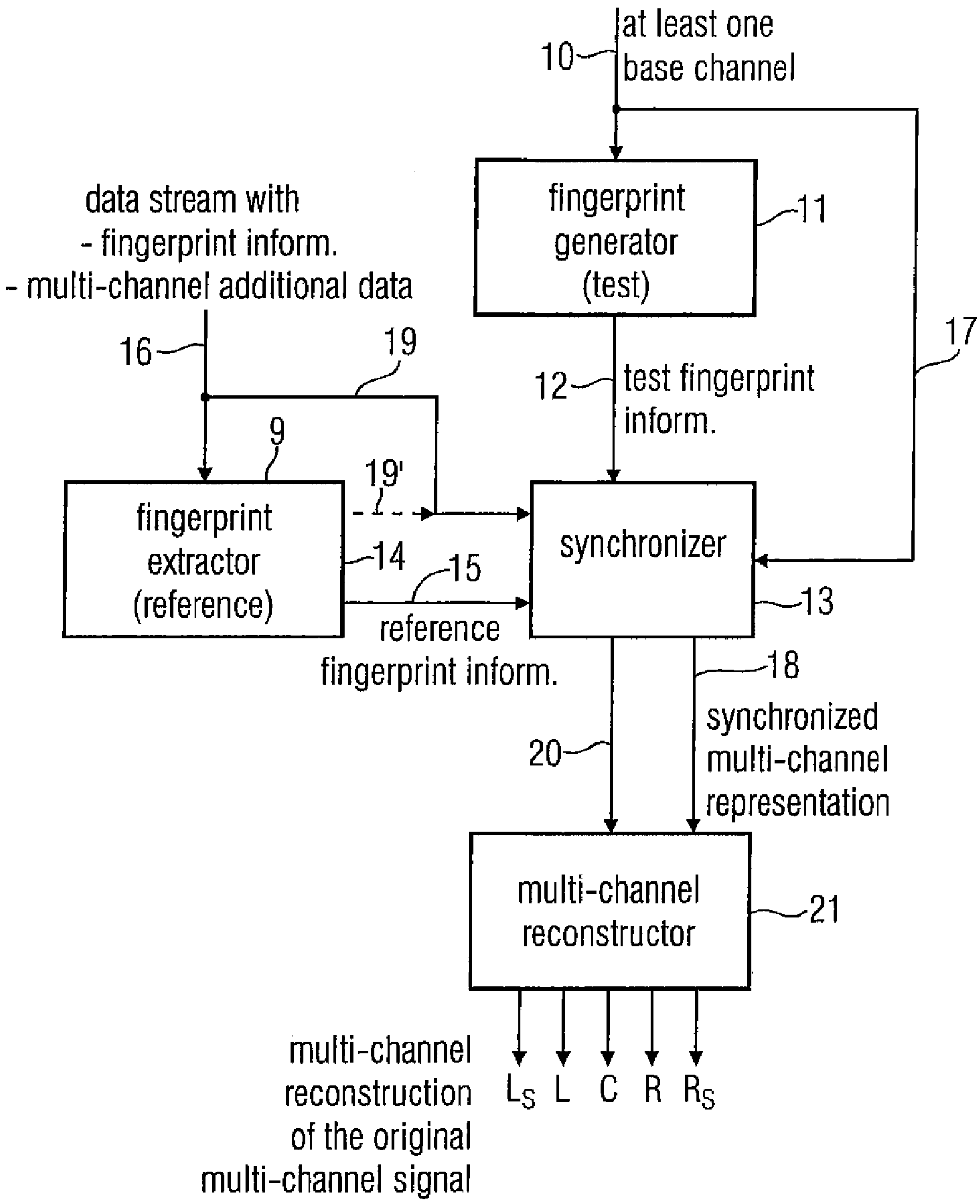
FIG. 2 is a block circuit diagram of an inventive device for generating a multi-channel representation.
Figure 3:
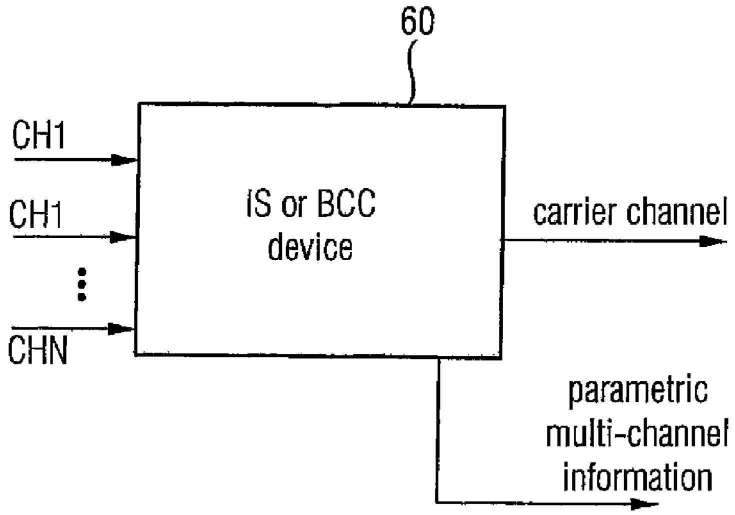
FIGURE 3 PRIOR ART
FIG. 3 shows a known joint stereo encoder for generating channel data and parametric multi-channel information.
Figure 4:
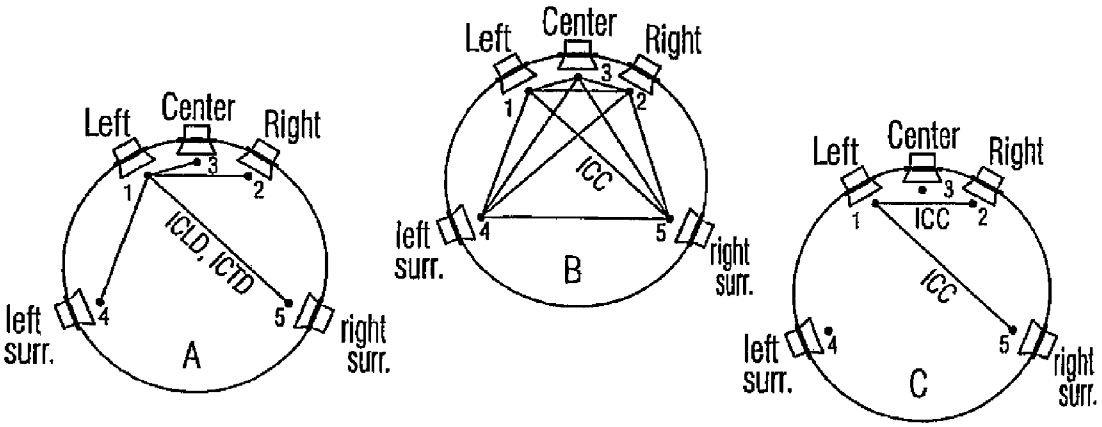
FIGURE 4 PRIOR ART
FIG. 4 is a representation of a scheme for determining ICLD, ICTD and ICC parameters for a BCC coding/decoding.

FIG. 2 shows an inventive device for generating a multi-channel representation of an original multi-channel signal from at least one base channel and a data stream comprising fingerprint information giving a progress in time of the at least one base channel and multi-channel additional information which, together with the at least one base channel, allow the multi-channel reconstruction of the original multi-channel signal, wherein a connection between the multi-channel additional information and the fingerprint information may be derived from the data stream. The at least one base channel is supplied to a fingerprint generator 11 on the receiver and/or decoder side via an input 10. On the output side, the fingerprint generator 11 provides test fingerprint information to a synchronizer 13 via an output 12. Advantageously, the test fingerprint information are derived from the at least one base channel by exactly the same algorithm also executed in block 2 of FIG. 1. Depending on the implementation, however, the algorithms do not necessarily have to be identical.

For example, the fingerprint generator 2 may generate a block fingerprint in absolute coding, while the fingerprint generator 11 on the decoder side performs a difference fingerprint determination such that the test block fingerprint associated with a block is the difference between two absolute fingerprints. In this case, i.e. when absolute block fingerprints come via the data stream with the fingerprint information, a fingerprint extractor 14 will extract the fingerprint information from the data stream and, at the same time, form differences so that data are supplied to the synchronizer 13 as reference fingerprint information via an output 15 that are comparable to the test fingerprint information.

Generally speaking, it is advantageous that the algorithms for the calculation of the test fingerprint information on the decoder side and the algorithms for the calculation of the fingerprint information on the encoder side, which, in FIG. 2, may also be referred to as reference fingerprint information, are at least so similar that the synchronizer 13 is able to associate the multi-channel additional data in the data stream received via an input 16 in a synchronized way with the data on the at least one base channel using these two pieces of information. As a multi-channel representation at the output of the synchronizer, a synchronized multi-channel representation is obtained that includes the base channel data and, synchronously thereto, the multi-channel additional data.

In this respect, it is advantageous that the synchronizer 13 determines a time offset between the base channel data and the multi-channel additional data and then delays the multi-channel additional data by this offset. It has been found that the multi-channel additional data normally arrive earlier, i.e. too early, which may be attributed to the considerably smaller amount of data typically corresponding to the multi-channel additional data as compared to the amount of data for the base channel data. Thus, if the multi-channel additional data are delayed, the data on the at least one base channel are supplied to the synchronizer 13 from input 10 via a base channel data line 17 and are actually only "passed through" it and output again at an output 18. The multi-channel additional data received via the input 16 are fed into the synchronizer via a multi-channel additional data line 19, delayed there by a determined offset and supplied to a multi-channel reconstructor 21 at an output 20 of the synchronizer together with the base channel data, the reconstructor then performing the actual audio rendering to generate, for example, the five audio channels and a woofer channel (not shown in FIG. 2) on the output side.

The data on the lines 18 and 20 thus constitute the synchronized multi-channel representation, wherein the data stream on the line 20 corresponds to the data stream at input 16 apart from a possibly present multi-channel additional data coding, except the fact that the fingerprint information are removed from the data stream, which, depending on the implementation, may be done in the synchronizer 13 or before. Alternatively, the fingerprint removal may also be done already in the fingerprint extractor 14 so that then there is no line 19, but a line 19' going directly from the fingerprint extractor 9 into the synchronizer 13. In this case, the synchronizer 13 is thus provided both with the multi-channel additional data and with the reference fingerprint information in parallel by the fingerprint extractor.

The synchronizer is thus designed to synchronize the multi-channel additional information and the at least one base channel using the test fingerprint information and the reference fingerprint information and using the connection of the multi-channel information with the fingerprint information contained in the data stream, which is derived from the data stream. As will be explained further below, the time connection between the multi-channel additional information and the fingerprint information is simply determined by whether the fingerprint information is located before a set of multi-channel additional information, after a set of multi-channel additional information or within a set of multi-channel additional information. Depending on whether the fingerprints are situated before, after or within a set of multi-channel additional information, there is a determination on the encoder side that exactly this multi-channel information belongs to this fingerprint information.

Advantageously, block processing is used. Also advantageously, the insertion of the fingerprints is done so that a block of multi-channel additional data follows a block fingerprint, i.e. that a block of multi-channel additional information alternates with a block fingerprint and vice versa. Alternatively, however, there might also be used a data stream format in which the complete fingerprint information is written into a separate part at the beginning of the data stream, whereupon the whole data stream follows. In this case, the block fingerprints and the blocks of multi-channel additional information thus would not alternate. Alternative ways for the association of fingerprints with multi-channel additional information are known to those skilled in the art. According to the invention, it is only necessary that a connection between the multi-channel additional information and the fingerprint information may be derived from the data stream on the decoder side so that the fingerprint information may be used to synchronize the multi-channel additional information with the base channel data.

Figure 7D:
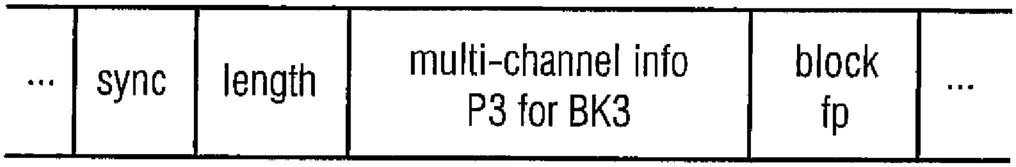
FIG. 7*d* is an exemplary representation for a block of the data stream of FIG. 7*c*.

Subsequently, an implementation of the blockwise processing is illustrated with respect to FIGS. 7*a* to 7*d*. FIG. 7*a* shows an original multi-channel signal, for example a 5.1 signal, consisting of a sequence of blocks B1 to B8, wherein multi-channel information MKi is contained in a block in the example shown in FIG. 7*a*. When assuming a 5-channel signal, each block, such as the block B1, contains the first, for example, 1152 audio samples of each individual channel. Such a block size is, for example, advantageous in the BCC encoder 112 of FIG. 5, wherein the block formation, i.e. the windowing, as it were, to obtain a sequence of blocks from a continuous signal, is achieved by the element 111 in FIG. 5 referred to as "block".

Figure 5:
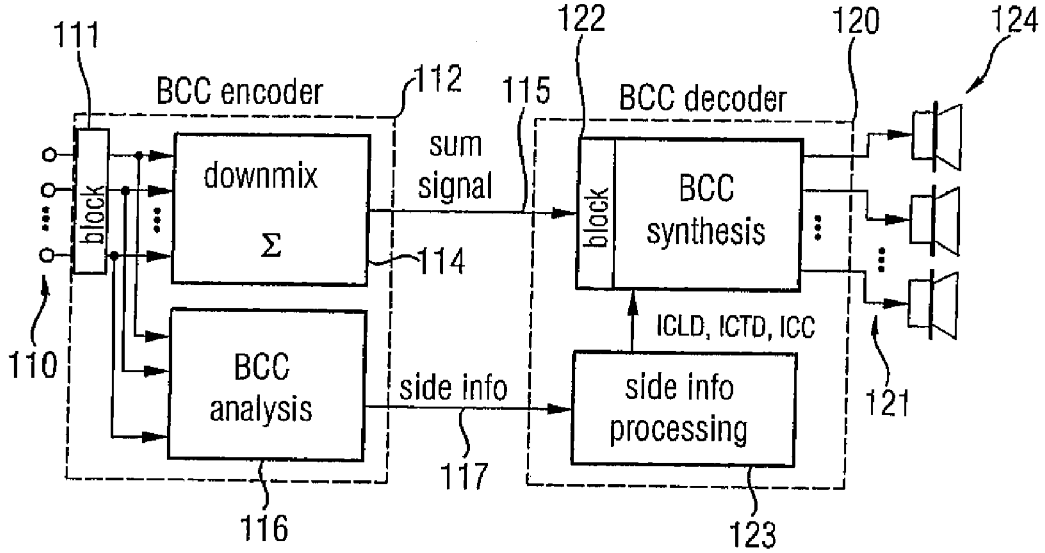
FIGURE 5 PRIOR ART
FIG. 5 is a block diagram representation of a BCC encoder/decoder chain.
Figure 6:
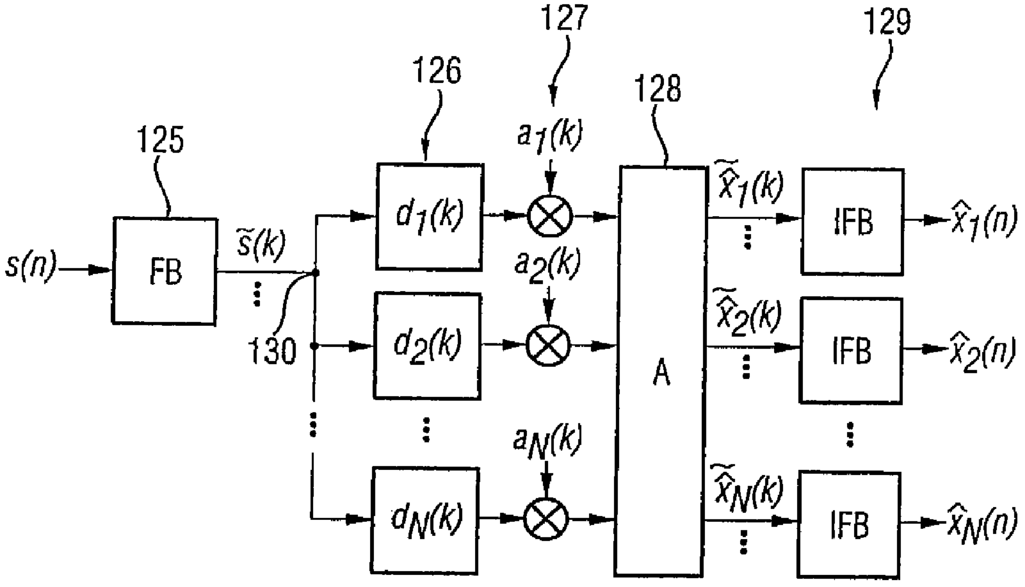
FIGURE 6 PRIOR ART
FIG. 6 is a block diagram of an implementation of the BCC synthesis block of FIG. 5.

The at least one base channel is applied to the output of the downmix block 114 referred to as "sum signal" in FIG. 5 and having the reference numeral 115. The base channel data may again be represented as a sequence of blocks B1 to B8, wherein the blocks B1 to B8 of FIG. 7*b* correspond to the blocks B1 to B8 in FIG. 7*a*. However, now a block does no longer contain the original 5.1 signal—if we remain in a time domain representation—, but only a mono signal or a stereo signal with two stereo base channels. The block B1 thus again includes the 1152 time samples of both the first stereo base channel and the second stereo base channel, wherein these 1152 samples of both the left stereo base channel and the right stereo base channel have each been calculated by sample-wise addition/subtraction and weighting, if applicable, i.e. by the operation for example performed in the downmix block 114 of FIG. 5. Correspondingly, the data stream with multi-channel information again includes blocks B1 to B8, wherein each block in FIG. 7*c* corresponds to the corresponding block of the original multi-channel signal in FIG. 7*a* and/or of the one or more base channels of FIG. 7*b*. In order to arrive at the reconstruction of, for example, block B1 of the original multi-channel signal MK1, the base channel data in block B1 of the base channel data stream referred to as BK1 have to be combined with the multi-channel information P1 of the block B1 in FIG. 7*c*. In the embodiment shown in FIG. 6, this combination is performed by the BCC synthesis block, which, in order to obtain a blockwise processing of the base channel data, again comprises a block forming stage at its input.

As shown in FIG. 7*c*, P3 thus refers to the multi-channel information which, together with the block of values BK3 of the base channels, allow to reconstruct a reconstruction of the block of values MK3 of the original multi-channel signal.

According to the invention, each block B1 of the data stream of FIG. 7*c* is now provided with a block fingerprint. For the block B3, this means that the block fingerprint F3 is written advantageously following the block P3 of multi-channel information. This block fingerprint is now derived exactly from the block B3 of the block of values BK3. Alternatively, the block fingerprint F3 could also be subjected to a difference coding so that the block fingerprint F3 is equal to the difference of the block fingerprint of block BK3 of the base channels and the block fingerprint of the block of values BK2 of the base channels. In an embodiment of the present invention, an energy measure and/or a difference energy measure is used as block fingerprint.

In the scenario described in the beginning, the data stream with the one or more base channels in FIG. 7*b* is transmitted separately from the data stream with the multi-channel information and the fingerprint information of FIG. 7*c* to a multi-channel reconstructor. If nothing else was done, the case could occur that, at the multi-channel reconstructor, for example at the BCC synthesis block 122 of FIG. 5, the block BK5 is next for processing. However, due to some time blurrings, it could further be that, among the multi-channel information, block B7 is next instead of block B5. Without further measures, a reconstruction of the block of base channel data BK5 would thus be done with the multi-channel information P7 which would result in artifacts. According to the invention, as will be explained further below, now an offset of two blocks is calculated such that the data stream in FIG. 7*c* is delayed by two blocks such that there is a multi-channel representation from the data stream of FIG. 7*b* and the data stream of FIG. 7*c* which, however, now have been synchronized to each other.

Depending on the implementation and design/accuracy of the fingerprint information, the inventive offset determination is not limited to the calculation of an offset as integer multiple of a block, but may well also achieve an offset accuracy that is equal to a fraction of a block and may reach up to one sample, in the case of a sufficiently accurate correlation calculation and using a sufficiently large number of block fingerprints (of course at the expense of the time duration for the calculation of the correlation). However, it has been found that such high accuracy is not necessarily needed, but that a synchronization accuracy of ±half a block (for a block length of 1152 samples) already results in a multi-channel reconstruction considered to be free of artifacts by a listener.

FIG. 7*d* shows an embodiment of a block B1, for example for the block B3 of the data stream in FIG. 7*c*. The block is initiated with a sync word which may, for example, have a length of one byte. Next is some length information, because it is advantageous to scale, quantize and entropy-code the multi-channel information P3, as known in the art, after its calculation, so that the length of the multi-channel information, which may, for example, be parameter information, but which may also be a waveform signal, for example of the side channel, is not known from the beginning and thus has to be signaled in the data stream. Then the inventive block fingerprint is inserted at the end of the multi-channel information P3. In the embodiment shown in FIG. 7*d*, one byte, i.e. eight bits, was taken for the block fingerprint. As only one single energy measure is taken per block, a quantizer is used in the quantization with a quantizer output width of eight bits in an embodiment in which only a quantization, but no entropy coding is used. The quantized energy values are thus entered into the 8-bit field "block FA" of FIG. 7*d* without further processing. Subsequently, although not shown in FIG. 7*d*, there is again a synchronization byte for the next block of the data stream which is again followed by a length byte and which is then followed by the multi-channel information P4 for BK4, wherein this block of multi-channel information P4 for the base channel data block BK4 is again followed by the block fingerprint based on the base channel data BK4.

As shown in FIG. 7*d*, an absolute energy measure or also a difference energy measure may be introduced as energy measure. In that case, the difference between the energy measure for the base channel data BK3 and the energy measure for the base channel data BK2 would be added to the block B3 of the data stream as block fingerprint.

Figure 8:
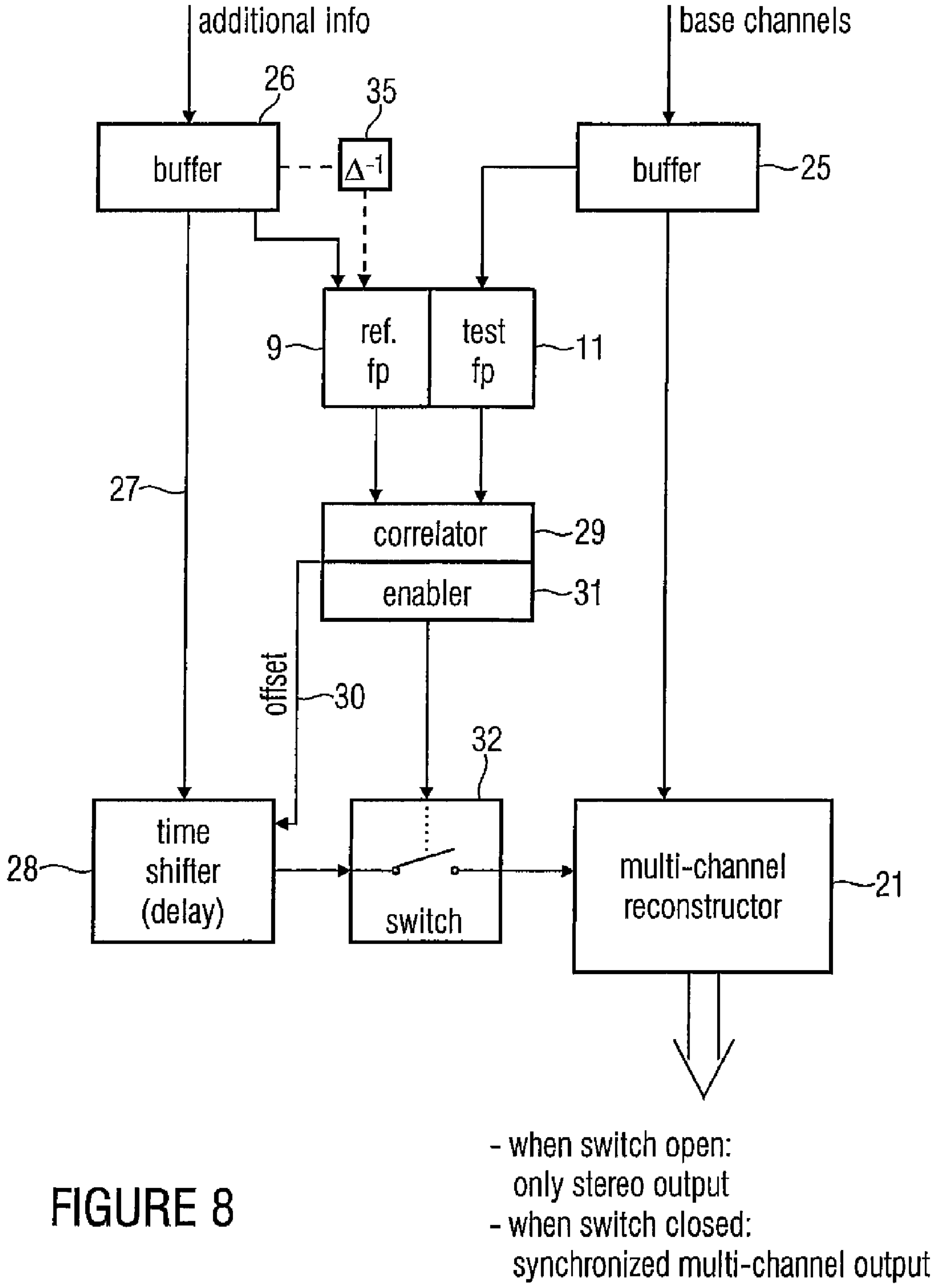
FIG. 8 is a detailed representation of the inventive device for generating a multi-channel representation according to an embodiment.

FIG. 8 shows a detailed representation of the synchronizer, the fingerprint generator 11 and fingerprint extractor 9 of FIG. 2 in cooperation with the multi-channel reconstructor 21. The base channel data are fed into a base channel data buffer 25 and are intermediately buffered. Correspondingly, the additional information and/or the data stream with the additional information and the fingerprint information is supplied to an additional information buffer 26. Generally speaking, both buffers are structured in the form of a FIFO buffer, wherein, however, the buffer 26 has further capacities in that the fingerprint information may be extracted by the reference fingerprint extractor 9 and are further removed from the data stream, so that only multi-channel additional information may be output on a buffer output line 27, but without inserted fingerprints. The removal of the fingerprints in the data stream, however, may also be performed by a time shifter 28 or any other element so that the multi-channel reconstructor 21 is not disturbed by fingerprint bytes in the multi-channel reconstruction. If absolute fingerprints are used both on the reference side and on the test side, the fingerprint information calculated by the fingerprint generator 11 may be fed directly into a correlator 29 within the synchronizer 13 of FIG. 2, just as the fingerprint information determined by the fingerprint extractor 9. The correlator then calculates the offset value and provides it to the time shifter 28 via an offset line 30. The synchronizer 13 is further designed to drive an enabler 31 when a valid offset value has been generated and provided to the time shifter 28, so that the enabler 31 closes a switch 32 such that the stream of multi-channel additional data from the buffer 26 is fed into the multi-channel reconstructor 21 via the time shifter 28 and the switch 32.

In the embodiment of the present invention, only a time shift (delay) of the multi-channel additional information is done. At the same time, there is already performed a multi-channel reconstruction in parallel to the calculation of the correct offset value so that a listener of the output of the multi-channel reconstructor 21 does not notice the time delay for the calculation of the correct offset value. This multi-channel reconstruction, however, is only a "trivial" multi-channel reconstruction, because the two stereo base channels are simply output by the multi-channel reconstructor 21. Thus, if the switch 32 is open, there will only be a stereo output. However, if the switch 32 is closed, the multi-channel reconstructor 21 also receives the multi-channel additional information in addition to the stereo base channels and may perform a multi-channel output that, however, is now synchronized. A listener will only notice this in that the stereo quality is switched to the multi-channel quality.

However, in cases of application in which initial time delays are not a major issue, the output of the multi-channel reconstructor 21 may be retained until there is a valid offset. Then already the very first block (BK1 of FIG. 7*b*) may be supplied to the multi-channel reconstructor 21 with the now correctly delayed multi-channel additional data P1 (FIG. 7*c*) so that the output is started only when there are multi-channel data. In this embodiment, there will be no output of the multi-channel reconstructor 21 with an opened switch.

Subsequently, the functionality of the correlator 29 of FIG. 8 will be illustrated with respect to FIG. 9. At the output of the test fingerprint calculator 11, a sequence of test fingerprint information is provided, as it can be seen in the uppermost subimage of FIG. 9. Thus, there is a block fingerprint for each block of the base channels, wherein this block is designated 1, 2, 3, 4, i. Depending on the correlation algorithm, only the sequence of discrete values is needed for the correlation. However, other correlation algorithms may also obtain a curve interpolated between the discrete values as input value, as drawn in FIG. 9. Correspondingly, the reference fingerprint determiner 9 also generates a sequence of discrete reference fingerprints which it extracts from the data stream. If, for example, difference-coded fingerprint information is contained in the data stream and if the correlator is to operate on the basis of absolute fingerprints, a difference decoder 35 in FIG. 8 is activated. However, it is advantageous that absolute fingerprints are contained as energy measure in the data stream, because this information on the total energy per block may also be used advantageously for level correction purposes by the multi-channel reconstructor 21. Furthermore, it is advantageous to perform the correlation on the basis of difference fingerprints. In this case, block 9 will perform a difference processing before the correlator, and also block 11 will perform a difference processing before the correlator, as already discussed.

Figure 9:
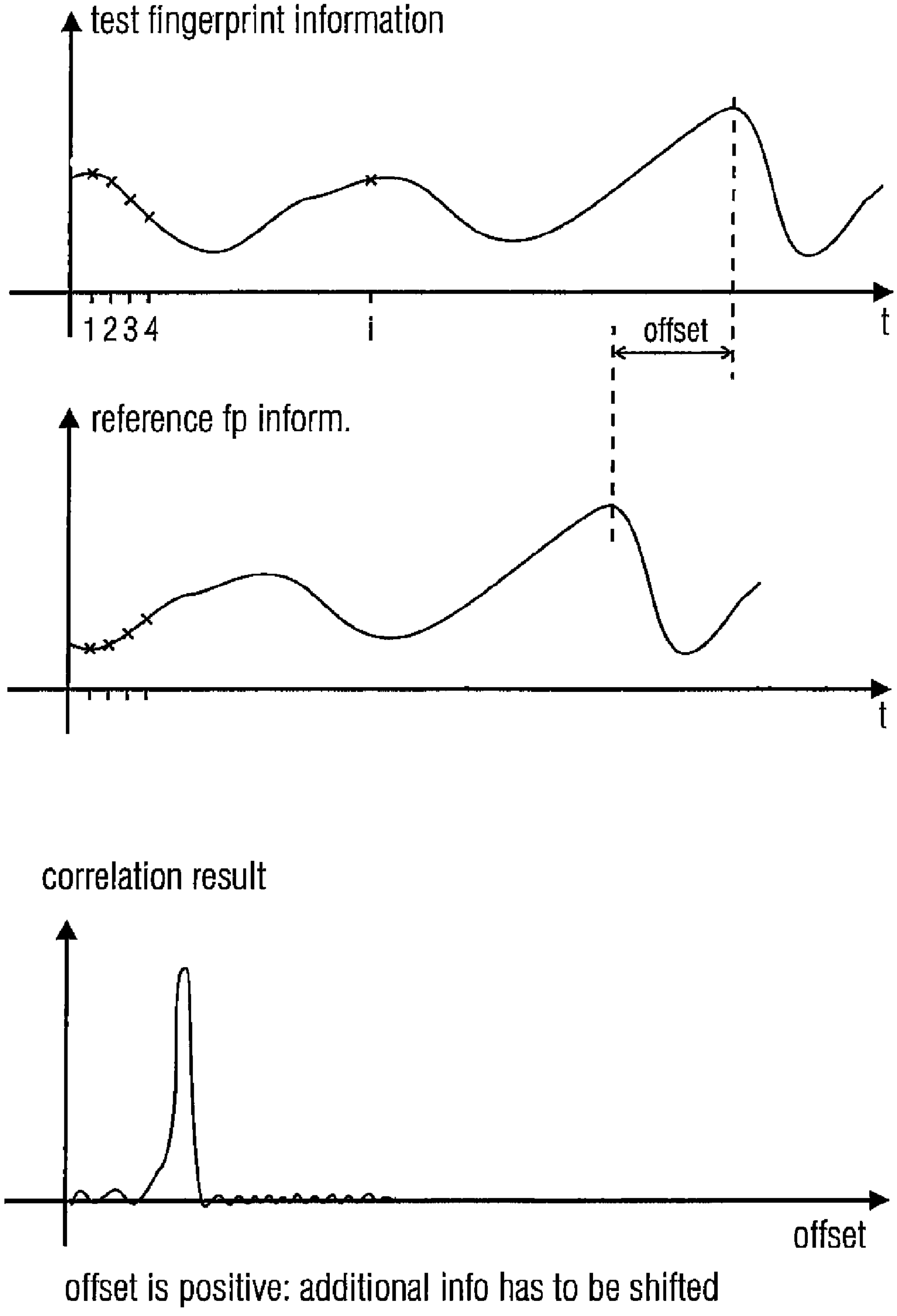
FIG. 9 is a schematic representation for illustrating the offset determination by correlation between the test fingerprint information and the reference fingerprint information.

The correlator 29 will now obtain the curves and/or sequences of discrete values illustrated in the two upper subimages of FIG. 9 and provide a correlation result illustrated in the lower subimage of FIG. 9. The result is a correlation result whose offset component provides exactly the offset between the two fingerprint information curves. Since, in addition, the offset is positive, the multi-channel additional information has to be shifted in positive time direction, i.e. has to be delayed. It is to be noted that, of course, the base channel data could also be shifted in the negative time direction or that the multi-channel additional information can be shifted some part in the positive direction and the base channel additional data may be shifted some part of the offset in the negative time direction, as long as the multi-channel reconstructor contains a synchronized multi-channel representation at its two inputs.

Figure 10:
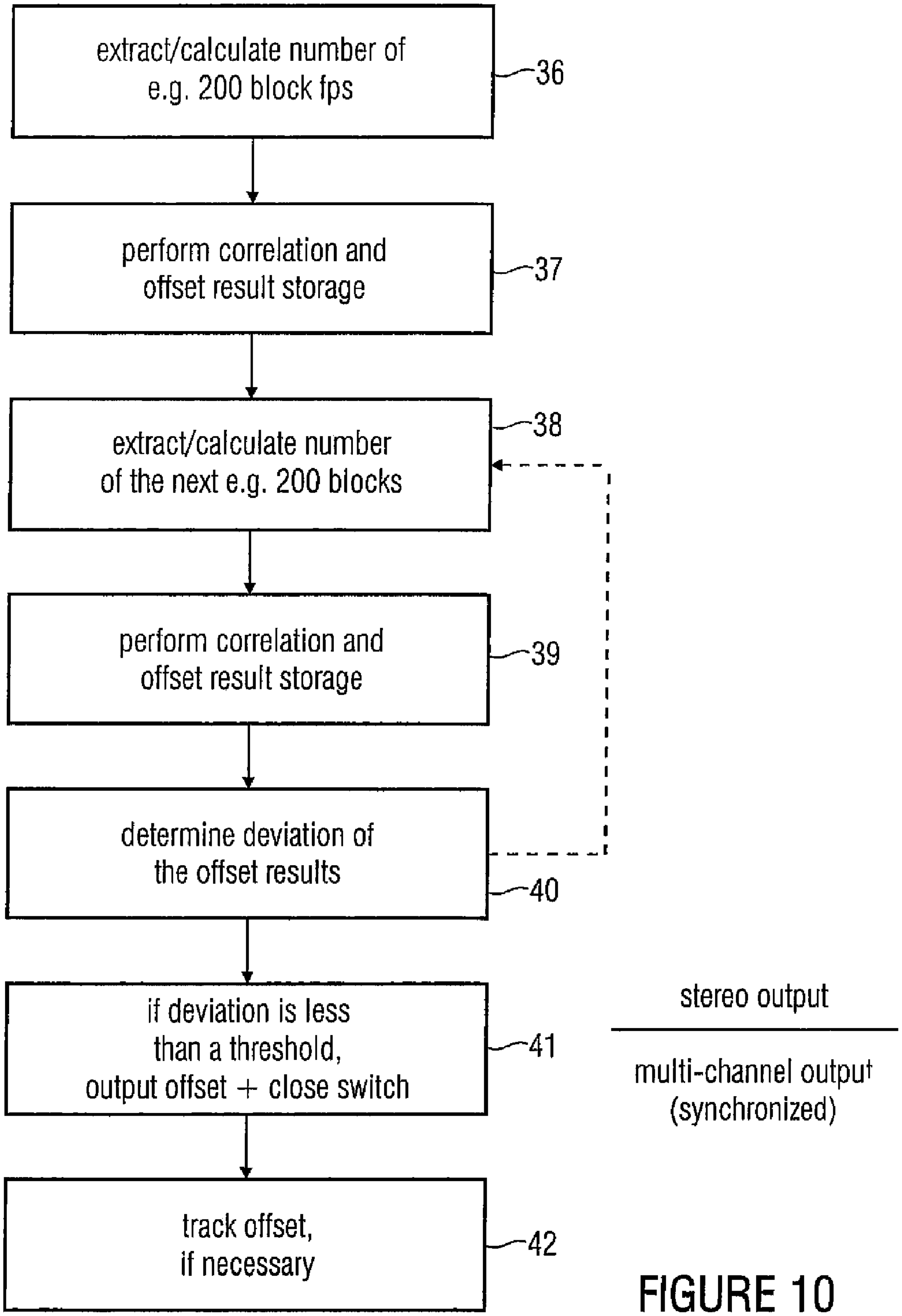
FIG. 10 is a flow diagram for an implementation of the offset determination in parallel to the data output.

Subsequently, an embodiment of the calculation of the offset in parallel to the audio output will be illustrated with respect to FIG. 10. The base channel data are buffered to be able to calculate one fingerprint, whereupon the block of which there has just been calculated a test block fingerprint is provided to the multi-channel reconstructor for multi-channel reconstruction. Subsequently, the next block of the base channel data is again fed into the buffer 25, so that a test block fingerprint may again be calculated from this block. This is performed, for example, for a number of 200 blocks. These 200 blocks, however, are simply output as stereo output data by the multi-channel reconstructor in the sense of a "trivial" multi-channel reconstruction, so that the listener will not notice any delay.

Depending on the implementation, there may also be used less than 200 blocks or more than 200 blocks. According to the invention, it has been found that a number between 100 and 300 blocks and advantageously 200 blocks yields results providing a reasonable compromise between calculation time, correlation computing effort and offset accuracy.

When block 36 has been processed, the process proceeds to block 37 in which the correlation between the 200 calculated test block fingerprints and the 200 calculated reference block fingerprints is performed by the correlator 29. The offset result obtained there is now stored. Then a number of the next, for example, 200 blocks of the base channel data is calculated in a block 38 corresponding to block 36. Correspondingly, 200 blocks are again extracted from the data stream with the multi-channel additional information. Subsequently, there is again performed a correlation in a block 39, and the offset result obtained there is stored. Then a deviation between the offset result based on the second 200 blocks and the offset result based on the first 200 blocks is determined in a block 40. If the deviation is below a predetermined threshold, the offset is provided to the time shifter 28 of FIG. 8 via the offset line 30 by a block 41, and the switch 42 is closed so that there is a switch to the multi-channel output from this time. A predetermined value for the deviation threshold is, for example, a value of one or two blocks. This is based on the fact that, when an offset does not change by more than one or two blocks from one calculation to the next calculation, no error has been performed in the correlation calculation.

Unlike this embodiment, there may also be used, as it were, a sliding window with a window length of a number of blocks, which is, for example, 200. For example, a calculation is done with 200 blocks and a result is obtained. Then the process advances one block and one block is withdrawn in the number of the blocks used for the correlation calculation and the new block is used instead. The obtained result is then stored in a histogram just like the result obtained previously. This procedure is done for a number of correlation calculations, such as 100 or 200, so that the histogram is gradually filled. The peak of the histogram is then used as calculated offset to provide the initial offset or to obtain an offset for dynamical readjusting.

The offset calculation taking place in parallel to the output will run along in a block 42, and, if necessary, when some drifting apart of the data stream with the multi-channel information and the data stream with the base channel data has been found, an adaptive and/or dynamic offset tracking is achieved by supplying an updated offset value to the time shifter 28 of FIG. 8 via the line 30. With respect to the adaptive tracking, it is to be noted that, depending on the implementation, there may also be performed a smoothing of the offset change so that, when a deviation of, for example, two blocks has been found, the offset is first incremented by 1 and is then incremented again, if necessary, so that the jumps do not become too large.

Subsequently, an embodiment of the fingerprint generator 2 on the encoder side, as illustrated in FIG. 1, and of the fingerprint generator 11 of FIG. 2, as used on the decoder side, is illustrated with respect to FIG. 11.

Generally, the multi-channel audio signal is divided into blocks of fixed size for the acquisition of multi-channel additional data. Now, a fingerprint is calculated per block simultaneously to the acquisition of the multi-channel additional data, which is suitable to characterize the time structure of the signal as uniquely as possible. An embodiment in this respect is to use the energy contents of the current downmix audio signal of the audio block, for example in logarithmic form, i.e. in a decibel-related representation. In this case, the fingerprint is a measure for the time envelope of the audio signal. In order to reduce the transmitted amount of information and to increase the accuracy of the measurement value, this synchronization information may also be expressed as difference to the energy value of the previous block with subsequently suitable entropy coding, for example, Huffman coding, adaptive scaling and quantization. The fingerprint of the time envelope is calculated as follows:

First, as illustrated at point 1 in FIG. 11, an energy calculation of the downmix audio signal in the current block is performed, possibly for a stereo signal. Here, for example, 1152 audio samples both of the left and the right downmix channel are each squared and summed up. $s_{left}(i)$ represents a time sample at the time i of the left base channel, while $s_{right}(i)$ represents a time sample of the right base channel at the time i. In a monophonic downmix signal, the summation is omitted. Furthermore, it is advantageous to remove the direct components of the downmix audio signal which are not meaningful for the present invention prior to the calculation.

In a step 2, a minimum limitation of the energy is performed for the purpose of a subsequent logarithmic representation. For a decibel-related evaluation of the energy, it is advantageous to use a minimum energy offset, so that there is a reasonable logarithmic calculation in the case of zero energy. This energy measure number in dB sweeps a numerical range from 0 to 90 (dB) in an audio signal resolution of 16 bits.

As shown at 3 in FIG. 11, it is advantageous not to use the absolute energy envelope value for an exact determination of the time offset between multi-channel additional information and received audio signal, but rather the slope (steepness) of the signal envelope. Therefore, only the slope of the energy envelope is used for the correlation measurement. Technically speaking, this signal derivation is calculated by difference formation of the energy value with that of the previous block. This step is performed, for example, in the encoder. Then the fingerprint consists of difference-coded values. Alternatively, this step may also be implemented purely on the decoder side. Here the transmitted fingerprint thus consists of non-difference-coded values. Here, the difference formation is only done in the decoder. The latter possibility has the advantage that the fingerprint contains information on the absolute energy of the downmix signal. However, there is typically needed a somewhat higher fingerprint word length.

Furthermore, it is advantageous to scale the energy (envelope of the signal) for an optimum control. It is useful to introduce an additional scaling (=gain) so that, in the subsequent quantization of this fingerprint, both the numerical range may be maximally used and the resolution for low energy values may be improved. It may be realized either as fixed and static weighting quantity or via a dynamic gain regulation adapted to the envelope signal.

Furthermore, as shown at 5 in FIG. 11, a quantization of the fingerprint is done. In order to prepare this fingerprint for the insertion into the multi-channel additional information, it is quantized to 8 bits. In practice, this reduced fingerprint resolution has proven to be a good compromise with respect to bit requirements and reliability of the delay detection. Numerical overflows of more than 255 are limited to the maximum value of 255 by a characteristic saturation curve.

As shown at 6 in FIG. 11, an optimal entropy coding of the fingerprint may be done then. By evaluating statistical properties of the fingerprint, the bit requirements of the quantized fingerprint may be further reduced. A suitable entropy method is, for example, the Huffman coding or the arithmetic coding. Statistically different frequencies of fingerprint values may be expressed by different code lengths and may thus reduce the bit requirements of the fingerprint representation in the average.

The calculation of the multi-channel additional data is performed per audio block with the help of the multi-channel audio data. Multi-channel additional information calculated in the process are subsequently extended by the synchronization information to be added by suitable embedding into the bit stream.

With the help of the inventive solution, the receiver is now capable of detecting a time offset of downmix signal and additional data and to realize a time-correct adaptation, i.e. a delay compensation between stereo audio signals and multi-channel additional information in the order of +/−½ audio block. Thus, the multi-channel association in the receiver may be reconstructed almost completely, i.e. except for a hardly perceptible time difference of +/−½ audio frames, which has no effect worth mentioning on the quality of the reconstructed multi-channel audio signal.

Further embodiments may be implemented as set out below. In one embodiment, there exist at least two base channels, and the fingerprint generator on the encoder side or on the decoder side is formed to add the at least two base channels sample-wise or spectral value-wise or to square them prior to the addition. Furthermore, the multi-channel additional data can be multi-channel parameter data each associated blockwise with corresponding blocks of the at least one base channel. A reconstructing device may include a multi-channel analyzer for the blockwise generation of both a sequence of blocks of the at least one base channel and a sequence of blocks of the multi-channel additional information, wherein the fingerprint generator is formed to calculate a block fingerprint value from each block of values of the at least one base channel. Depending on the situation, the fingerprint generator is formed to scale fingerprint values with scaling information from the data stream.

Depending on the circumstances, the inventive method for generating and/or decoding may be implemented in hardware or in software. The implementation may be done on a digital storage medium, particularly a floppy disk or CD having control signals that may be read out electronically, which may cooperate with a programmable computer system so that the method is executed. Generally, the invention thus also consists in a computer program product with a program code stored on a machine-readable carrier for performing the method, when the computer program product runs on a computer. In other words, the invention may thus be realized as a computer program with a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for generating a data stream for a multi-channel reconstruction of an original multi-channel signal, wherein the multi-channel signal comprises at least two channels, comprising:

a fingerprint generator for generating fingerprint information from at least one base channel derived from the original multi-channel signal, wherein a number of base channels is equal to or larger than 1 and less than a number of channels of the original multi-channel signal, wherein the fingerprint information gives a progress in time of the at least one base channel; and a data stream generator for generating a data stream from the fingerprint information and of time-variable multi-channel additional information which, together with the at least one base channel, allow the multi-channel reconstruction of the original multi-channel signal, wherein the data stream generator is formed to generate the data stream so that a time connection between the multi-channel additional information and the fingerprint information may be derived from the data stream.

2. The device of claim 1, wherein the fingerprint generator is formed to process the at least one base channel blockwise to obtain the fingerprint information, wherein the multi-channel additional information is calculated blockwise so that they are to be used together with blocks of the at least one base channel for the multi-channel reconstruction, and wherein the data stream generator is formed to write the multi-channel additional information and the fingerprint information blockwise into the data stream.

3. The device of claim 2, wherein the fingerprint generator is formed to generate, as fingerprint information for a block of the at least one base channel, a block fingerprint giving a progress in time of the base channel in the block, wherein a block of the multi-channel additional information is to be used together with the block of the base channel for the multi-channel reconstruction, and wherein the data stream generator is formed to write the data stream blockwise so that the block of multi-channel additional information and the block of fingerprint information comprise a predetermined relationship to each other.

4. The device of claim 2, wherein the fingerprint generator is formed to calculate a sequence of block fingerprints as fingerprint information for blocks of the at least one base channel that are subsequent in time, wherein the multi-channel additional information is given blockwise for blocks of the at least one base channel that are subsequent in time, and wherein the data stream generator is formed to write the sequence of block fingerprints in a predetermined relationship to the sequence of blocks of the multi-channel additional information.

5. The device of claim 4, wherein the fingerprint generator is formed to calculate a difference between two fingerprint values of two blocks of the at least one base channel as block fingerprint.

6. The device of claim 1, wherein the fingerprint generator is formed to scale fingerprint values with scaling information and to further write the scaling information into the data stream in association with the fingerprint information.

7. The device of claim 1, wherein the fingerprint generator is formed to calculate the fingerprint information blockwise, and wherein the data stream generator is formed to write the data stream blockwise so that a block of the data stream comprises a block of multi-channel additional information and a block of fingerprint information associated with the block of multi-channel additional information and a block of the at least one base channel.

8. The device of claim 1, wherein the fingerprint generator is formed to use data on an energy envelope of the at least one base channel as fingerprint information, and wherein the fingerprint generator is further formed to use a minimum limitation of the energy and to provide a logarithmic representation of a minimum-limited energy.

9. The device of claim 1, wherein the data stream generator is formed to write the data stream into a separate data channel existing in addition to a standard data channel, via which the at least one base channel may be transmitted to a multi-channel reconstructor.

10. The device of claim 9, wherein the standard data channel is a standardized channel for a digital stereo radio signal or a standardized channel for transmission via the internet.

11. A device for generating a multi-channel representation of an original multi-channel signal from at least one base channel and a data stream comprising fingerprint information giving a progress in time of the at least one base channel and multi-channel additional information which, together with the at least one base channel, allow the multi-channel reconstruction of the original multi-channel signal, wherein a connection between the multi-channel additional information and the fingerprint information may be derived from the data stream, comprising:

a fingerprint generator for generating test fingerprint information from the at least one base channel;

a fingerprint extractor for extracting the fingerprint information from the data stream to obtain reference fingerprint information; and a synchronizer for synchronizing the multi-channel additional information and the at least one base channel in time using the test fingerprint information, the reference fingerprint information and a connection of the multi-channel information and the fingerprint information included in the data stream, which is derived from the data stream, to obtain a synchronized multi-channel representation.

12. The device of claim 11, wherein the data stream comprises a sequence of blocks of multi-channel additional data in time connection with a sequence of reference fingerprint values as reference fingerprint information, wherein the extractor is formed to determine an associated fingerprint value to a block of multi-channel additional data based on the time connection;

wherein the fingerprint generator is formed to determine a sequence of test fingerprint values as test fingerprint information for a sequence of blocks of the at least one base channel;

wherein the synchronizer is formed to calculate an offset between the blocks of multi-channel additional data and the blocks of the at least one base channel based on an offset between the sequence of test fingerprint values and the sequence of reference fingerprint values, and to compensate the offset by delaying the sequence of blocks of the multi-channel additional information using the calculated offset.

13. The device of claim 11, wherein the fingerprint generator is formed to perform a quantization of fingerprint values to obtain the test fingerprint information.

14. The device of claim 11, wherein the fingerprint generator is formed to use data on an energy envelope of the at least one base channel as fingerprint information.

15. The device of claim 11, wherein the fingerprint generator is formed to use data on an energy envelope of the at least one base channel as fingerprint information, and wherein the fingerprint generator is further formed to use a minimum limitation of the energy and to provide a logarithmic representation of a minimum-limited energy.

16. The device of claim 11, wherein the data stream is organized blockwise, and a block of multi-channel additional information and a block fingerprint are included in a block of the data stream, wherein the fingerprint generator is formed to calculate a difference between two block fingerprints of the at least one base channel as test fingerprint information, and wherein the fingerprint extractor is further formed to calculate a difference of two block fingerprints in the data stream and to provide it as reference fingerprint information to the synchronizer.

17. The device of claim 11, wherein the synchronizer is formed to calculate an offset between the multi-channel additional data and the at least one base channel in parallel to an audio output and to compensate the offset adaptively.

18. The device of claim 11, further formed to reproduce the at least one base channel when there are no synchronized multi-channel additional data yet, and to switch from a mono or stereo reproduction of the at least one base channel to a multi-channel reproduction when there are synchronized multi-channel additional data.

19. The device of claim 11, formed to obtain the data stream and the at least one base channel via bit streams separate from each other, which are received via two logic channels or physical channels different from each other, or are obtained via the same transmission channel which, however, is active at different times.

20. A method for generating a data stream for a multi-channel reconstruction of an original multi-channel signal, wherein the multi-channel signal comprises at least two channels, comprising:

generating fingerprint information from at least one base channel derived from the original multi-channel signal, wherein a number of base channels is equal to or larger than 1 and less than a number of channels of the original multi-channel signal, wherein the fingerprint information gives a progress in time of the at least one base channel; and generating a data stream from the fingerprint information and of time-variable multi-channel additional information which, together with the at least one base channel, allow the multi-channel reconstruction of the original multi-channel signal, wherein the data stream is generated so that a time connection between the multi-channel additional information and the fingerprint information may be derived from the data stream; wherein the method is implemented by hardware.

21. A non-transitory computer readable medium including computer readable instructions for performing the method of claim 20.

22. A method for generating a multi-channel representation of an original multi-channel signal from at least one base channel and a data stream comprising fingerprint information giving a progress in time of the at least one base channel and multi-channel additional information which, together with the at least one base channel, allow the multi-channel reconstruction of the original multi-channel signal, wherein a connection between the multi-channel additional information and the fingerprint information may be derived from the data stream, comprising:

generating test fingerprint information from the at least one base channel;

extracting the fingerprint information from the data stream to obtain reference fingerprint information; and synchronizing the multi-channel additional information and the at least one base channel using the test fingerprint information, the reference fingerprint information and a connection of the multi-channel information and the fingerprint information included in the data stream, which is derived from the data stream, to obtain a synchronized multi-channel representation; wherein the method is implemented by hardware.

23. A non-transitory computer readable medium including computer readable instructions for performing the method of claim 22.

24. A device for receiving a data stream, the data stream comprising fingerprint information giving a progress in time of at least one base channel derived from an original multi-channel signal, wherein a number of base channels is equal to or larger than 1 and less than a number of channels of the original multi-channel signal, and multi-channel additional information which, together with the at least one base channel, allow the multi-channel reconstruction of the original multi-channel signal, wherein a connection between the multi-channel additional information and the fingerprint information may be derived from the data stream; and the device for receiving further comprising:

a buffer for buffering the fingerprint information and the multi-channel additional information.

25. The device for receiving the data stream of claim 24, wherein the data stream is stored on a computer readable medium or transmitted via a data transmission path.

* * * * *